Dec. 22, 1953 R. E. HELTZEL 2,663,466
OPERATING MECHANISM FOR COMPRESSIBLE
SEALING CLOSURES FOR HOPPERS
Filed July 26, 1951 2 Sheets-Sheet 1
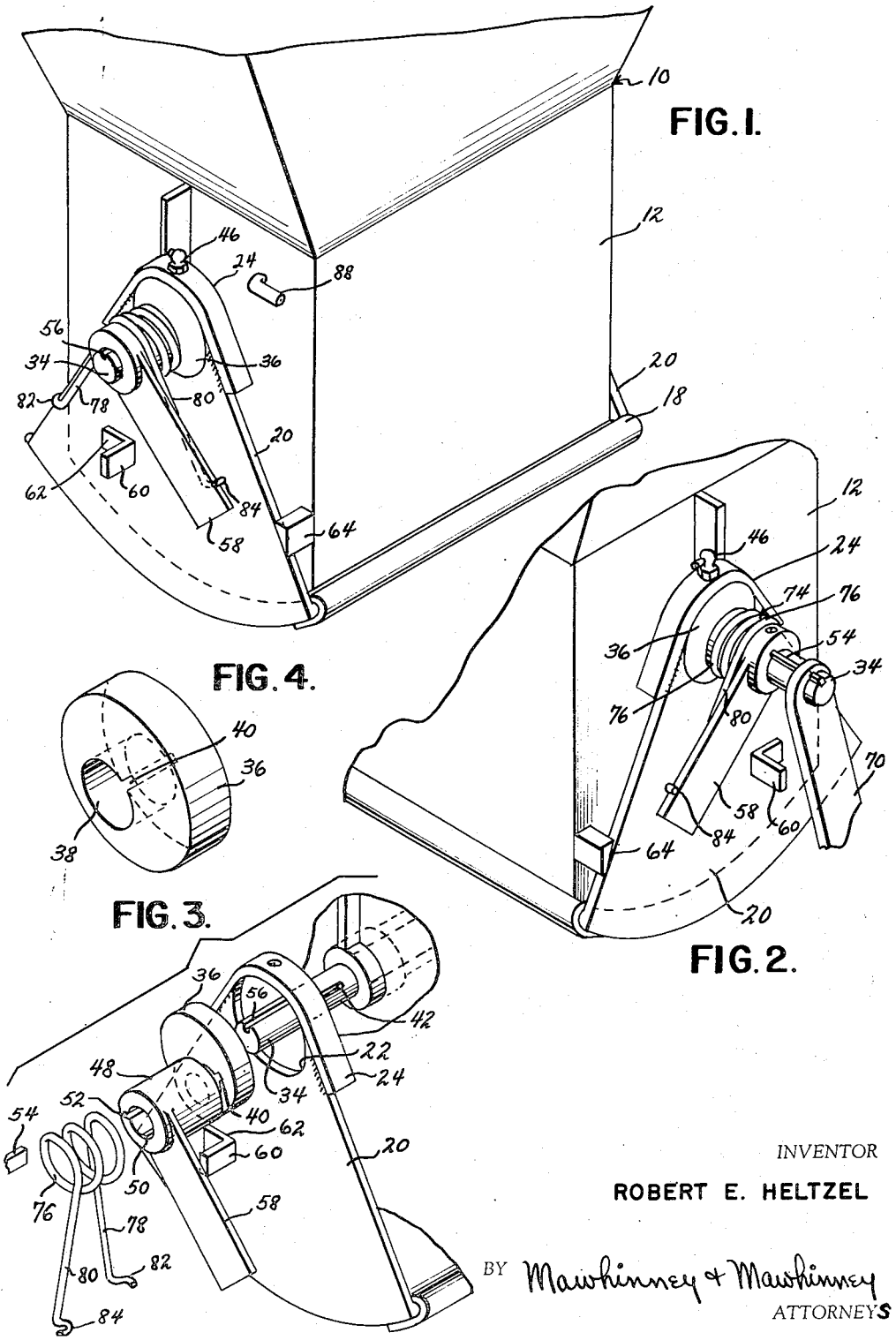
INVENTOR
ROBERT E. HELTZEL
BY Mawhinney & Mawhinney
ATTORNEYS Dec. 22, 1953   R. E. HELTZEL   2,663,466
OPERATING MECHANISM FOR COMPRESSIBLE
SEALING CLOSURES FOR HOPPERS
Filed July 26, 1951   2 Sheets-Sheet 2
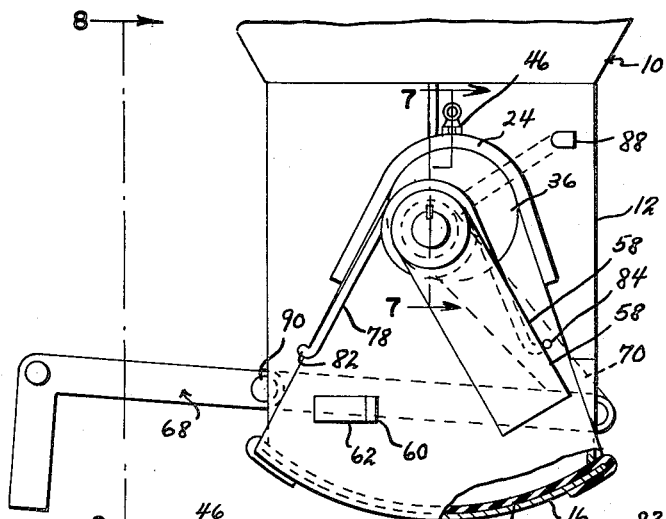
FIG. 5.
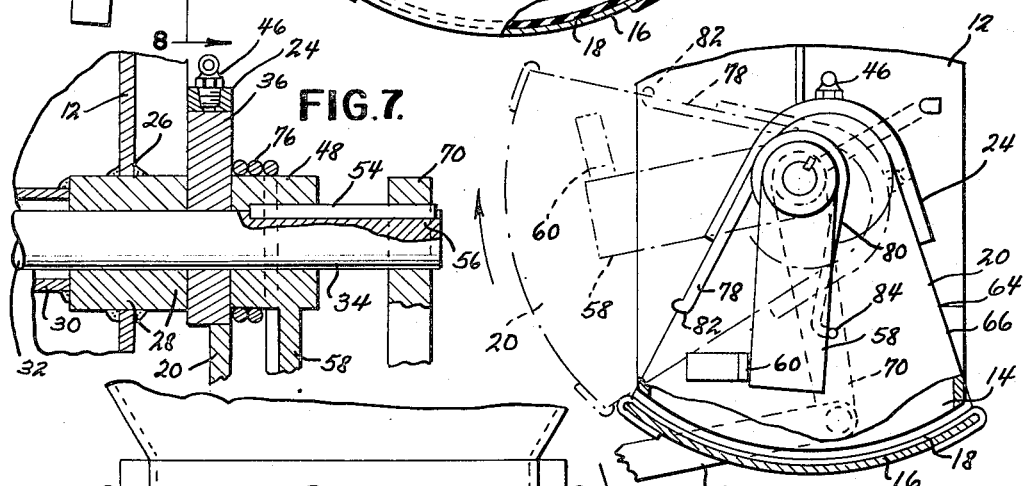
FIG. 6.
FIG. 7.
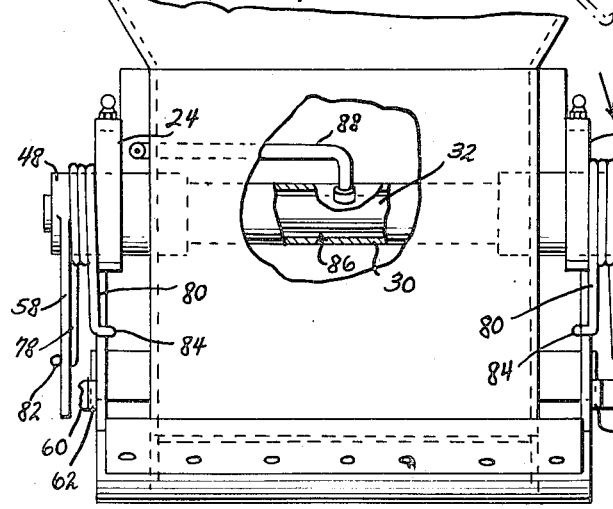
FIG. 8.
INVENTOR
ROBERT E. HELTZEL
BY Mawhinney & Mawhinney
ATTORNEYS Patented Dec. 22, 1953

2,663,466

UNITED STATES PATENT OFFICE 2,663,466

OPERATING MECHANISM FOR COMPRESSIBLE SEALING CLOSURES FOR HOPPERS

Robert E. Heltzel, Warren, Ohio

Application July 26, 1951, Serial No. 238,657

7 Claims. (Cl. 222—505)

This invention appertains to improvements in operating mechanisms for sealing closures of the type disclosed in my co-pending application Serial No. 131,762, filed December 8, 1949.

The primary object of this invention is to provide an improved single control means or operating mechanism for effecting a rectilinear and angular swinging movement of a gate for the discharge opening of a hopper or bin, the gate being sequentially movable from a liquidtight closed position, in relation to the discharge opening, to an open position out of alignment with the opening.

A further object of this invention is to provide a rotary power operator, which is connected to a gate to effect an angular swinging movement of the gate with respect to the discharge opening of a hopper and a linear movement of the gate relative to the opening and which operator, due to its mode of attachment to the gate, is useable with bulk materials, such as cement, flour, etc., without occasioning any clogging or obstruction of the moving parts and permitting the positioning of the gate in an enclosure.

Broadly considered, this invention provides a rotary power operator which is adapted to be mounted on a chute, having a discharge opening, to operate a gate for the opening, means being provided for mounting the gate on the operator for linearly moving the gate from the discharge opening consequent on relative rotative movement of the operator relatively to the gate, and to further provide means between the operator and the gate for entraining the gate to angularly swing into and out of alignment with the gate, means being provided for arresting the gate during its closing swinging movement to permit relative rotative movement of the operator to the gate, so that the gate is in alignment with the opening before the operator rotates relative to the gate to raise the gate in a straight line motion into tight sealing engagement with the edge of the discharge opening.

The foregoing and ancillary objects are attained by this invention, the preferred embodiment of which is set forth in the following description and illustrated in the accompanying drawings, wherein:

Figure 1 is a fragmentary perspective view of a conventional hopper which is provided with a rectilinearly and curvilinearly moving gate, constructed and operated in accordance with this invention;

Figure 2 is a fragmentary perspective view of one side of the gate, illustrating the mounting and operating means therefor;

Figure 3 is an exploded perspective view of the operating mechanism for effecting a rectilinear and angular swinging movement of the gate;

Figure 4 is a perspective view of an eccentric, which mounts the gate on the shaft;

Figure 5 is a side elevational view, partly in section;

Figure 6 is a similar view to Figure 5, with the parts shown in subsequent position;

Figure 7 is a detailed sectional view taken on line 7—7 of Figure 5, and

Figure 8 is an end elevational view taken from the end 8—8 of Figure 5, with part of the hopper chute broken away to illustrate the lubricating system.

Referring now more particularly to the accompanying drawings, a conventional hopper 10 is illustrated, for exemplary purposes, the same having an outlet chute 12 provided with a discharge opening 14.

An arcuate gate 16 provides a closure for the opening and is provided on its concave side with a compressible lining 18, so that the edges of the gate are sealingly engageable with the lower edges of the chute. The gate is formed at its opposing sides with upstanding mounting flanges or side plates 20 which are disposed exteriorly of opposite sides of the chute. Peripheral semi-circular openings 22 are formed in the minor or free ends of the plates and are enclosed by arcuate cam straps or bars 24, which are welded in an encompassing fashion on the periphery of the ends.

Circular openings 26 are formed in the opposing sides of the chute, the openings being aligned and receiving the enlarged bearing ends 28 of an elongated sleeve or hollow shaft 30. The ends 28 of the sleeve are fixed transversely in the openings and rotatably receive an operating shaft 32, which is rotatably disposed in the sleeve and has its opposing ends 34 projecting beyond the bearing ends 28.

Eccentrics 36 are fixedly circumposed on each end 34 of the shaft 32, the bore 38 of each eccentric being formed with an axial keyway 40 which is complemental to a longitudinal keyway 42 on the shaft for the reception of a key 44. The eccentrics are rotatably disposed within the openings 22 in the side plates of the gate, with the straps 24 providing an increased bearing surface for the eccentrics. Grease fittings 46 are mounted in the straps to provide means for lubricating the eccentrics.

Collars 48 are keyed on the extending ends 34 of the shaft in spaced relation to the bearing ends 22 of the sleeve and the eccentrics are disposed between the bearing ends 28 and the collars 48 so that the eccentrics 36 are constrained from axial displacement. The bore 50 of each of the collars is formed with an axial keyway 52 to receive a key 54, which is engageable in a keyway 56 formed longitudinally on the shaft ends.

The collars provide a shaft mounting means for arms 58, which extend radially from the collars and are fixed to the shaft for swinging movement correspondent to the rotative movement of the shaft, the shaft and the arms providing a rotary power operator. Abutments 60 are mounted on the side plates of the gate, the abutments being arranged normal to the plates and secured by mounting flanges 62. The abutments are positioned in the path of swinging movement of the arms 58 and entrain the gate to the shaft so that the gate can be angularly swung out of alignment with the discharge opening.

Stops 64 are fixed on the opposite sides of the outlet chute adjacent the rear edges thereof and have beveled front faces 66, which are inclined complemental to the slope of the rear edges of the side plates, the rear edges abutting the faces of the stops to limit the return movement of the gate and arrest the gate in its closing swinging movement.

Means is provided for rotating the operating shaft 32 and preferably includes an articulated linkage 68, which is pivotally connected to one end of an arm 70. The arm is formed at its other end with an opening 72 fixedly circumposed on one of the ends of the shaft by the key 54.

In order to prevent relative angular movement between the gate and the arms 58 during the angular movement of the gate to a position in alignment with the discharge opening in the chute, so that rectilinear movement of the gate toward the chute opening is prevented until the gate encounters the stops 64, resilient means 74 is operatively disposed between the shaft and the gate. The means 74 includes helical springs 76, which are concentrically disposed on the collars 48 and are formed at their opposing ends with radially extending legs 78 and 80. The springs are wound about the collars 48 in a suitable number of convolutions and are suitably conditioned for desired strength and resiliency. One leg 78 of the springs extends radially from the shaft and terminates in a hook 82, which engages the rearward edge of the arms 58, with the other radially projecting leg 80 having a hook terminal 84, which bears against the forward edge of the side walls of the gate.

It will be noted, with regard to Figure 8, that the shaft 32 is spaced out of engagement with the sleeve 30 to define a lubrication chamber 86, which is communicated by a pipe 88 with a source of lubricating oil or similar substance. The pipe 88 is extended through a suitable opening in one of the sides of the chute.

The gate 16 is illustrated in Figure 6 in a closed position, the lining 18 being compressed against the lower edges of the chute and effectively sealing off the opening 14. The gate is held in a raised position by the eccentrics 36. Accidental rotation of the eccentrics, incident to unintentional rotation of the shaft 32, as by the imposition of a superimposed load on the gate is, of course, obviated by the actuating linkage 68, which affords a lock, as seen in Figure 5, due to the fact that the links are positioned below dead center of the pivot connection 90. In this position, the gate is constrained from rearward swinging movement by the stops 64 and the arms 58 depend rearwardly from the shaft 32. The arms are spaced from the abutments 60, with the legs of the springs being extended apart so that the springs 76 are tightly wound on the collars 48.

In operation in opening the gate from the fully closed position of Figure 5, the shaft 32 is rotated in a clockwise direction and the initial rotative movement of the shaft, under the power of the linkage 68, which, of course, is moved out of its locked position, effects a corresponding rotary movement of the eccentrics 36. Thus, during the initial movement of the shaft, the eccentrics 36 cam the gate 16 to an open position, the gate moving down away from the chute in a straight line motion as seen in Figure 6. The gate 16 and its associated lining 18 are thus freed from tight engagement with the chute and the gate is free to swing in an angular path of movement away from the discharge opening 14.

In moving through this initial angular movement the shaft 32 has carried around with it the arms 58 from the position of Figure 5 to that of Figure 6 where the arms 58 now encounter the abutments 60 entraining the gate 16 to swing with the arms 58 throughout the remainder of the rotative movement of the shaft 32 and arms 58, that is to the dotted position of Figure 6 in which the gate 16 is swung to one side clear of the chute opening 14.

The spring helices 76 constantly exert a constrictive force on the spring legs 78, 80 tending to move the legs angularly toward one another; but inasmuch as the legs 80 are anchored fixedly to the forward edges of the gate 16 the effective action of the springs 76 is to tend to move the arms 58 against the abutments 60 and to hold them yieldingly in that position.

In closing, the shaft 32 is rotated in an opposite direction and, in swinging counter-clockwise, the arms 58 with the abutments engaging the arms will transmit a follow motion to the gate. The legs of the springs will retain the arms 58 in engagement of the abutments so that relative rotation of the operator to the gate is prevented and the gate will hang on the arms, as the gate shears through the material gravitating from the chute.

When the side plates of the gate strike the stops 64, the angular motion of the gate is arrested. At that time, the spring pressure is overcome by a torsional force transmitted to the arms 58 by continued rotation of the shaft and, as the spring pressure is overcome, the operator rotates relative to the arrested gate with the eccentrics initiating an upward camming action on the cam straps. The eccentrics bear on the cam straps and the gate is lifted in a rectilinear path to bring the lining into compressed engagement with the edges of the chute. The vertical movement of the gate in a straight line path of movement will, therefore, cause the gate to seal itself over the discharge opening.

Due to the fact that the eccentrics, supporting the gate, are keyed on the shaft and the operating parts are also keyed on the shaft, the gate can be disposed in an enclosure and can be employed with discharge chutes for bulk materials of a powdery nature and materials that cause an accumulation of dust. Also, the shaft and eccentrics can be lubricated to insure proper function thereof, notwithstanding dusty operating conditions, that may exist.

While only one embodiment of this invention has been illustrated and described, modifications

What is claimed is:

1. In a device as described, a chute having a discharge opening, a gate mounted for linear movement toward and from said discharge opening and for angular swinging movement into and out of alignment with the discharge opening, an operating shaft mounted on the chute for rotative movement, eccentrics fixedly circumposed on the shaft and engaging the gate to linearly move the gate in response to rotative movement of the shaft relative to the gate, an abutment on said gate, a member radially extending from the shaft and engageable with the abutment after initial relative rotative movement of the shaft to entrain the gate to angularly swing to an open position out of alignment with the discharge opening, a stop positioned to arrest the closing swinging movement of the gate and to permit rotative movement of the shaft relative to the arrested gate in which the member on the shaft is disengaged from the abutment and spring means mounted on the shaft and engaging the gate and the member to yieldably prevent rotative movement of the shaft relative to the gate during the closing swinging movement of the gate and until the gate is arrested by the stop whereupon the shaft overcomes the tension of the spring means and moves relative to the arrested gate to move the gate linearly to a closed position.

2. In a device as described, a chute having a discharge opening, a gate mounted for linear movement toward and from said discharge opening and for angular swinging movement into and out of alignment with the discharge opening, a rotary driven operating shaft journalled in the chute for rotative movement, eccentrics fixedly circumposed on the shaft and engaging the gate to linearly move the gate in response to rotative movement of the shaft relative to the gate, an abutment on said gate, a member radially extending from and fixed to the shaft and engageable with the abutment after initial relative rotation movement of the shtft to entrain the gate to angularly swing to an open position out of alignment with the discharge opening, a stop positioned to arrest the closing swinging movement of the gate and to permit rotative movement of the shaft relative to the arrested gate in which the member on the shaft is disengaged from the abutment and resilient means carried by the shaft and abutting the gate and the member to yieldably prevent rotative movement of the shaft relative to the gate during the closing swinging movement of the gate and until the gate is arrested by the stop.

3. In a device as described, a chute having a discharge opening, a gate mounted for linear movement toward and from said discharge opening and for angular swinging movement into and out of alignment with the discharge opening, an operating shaft mounted on the chute for rotative movement, eccentrics fixedly circumposed on the shaft and engaging the gate to linearly move the gate in response to rotative movement of the shaft relative to the gate, an abutment on said gate, a member radially extending from the shaft and engageable with the abutment after initial relative rotative movement of the shaft to entrain the gate to angularly swing to an open position out of alignment with the discharge opening, a stop positioned to arrest the closing swinging movement of the gate and to permit rotative movement of the shaft relative to the arrested gate in which the member on the shaft is disengaged from the abutment and a spring helically wound concentric to the shaft and having radially extending legs at its ends, one of said legs engaging the gate and the other engaging the member to yieldably restrain the member from movement relative to the gate during the closing swinging movement of the gate and to prevent rotative movement of the shaft relative to the gate until the gate is arrested by the stop.

4. For use with a chute having a discharge opening, a closure for said opening including a rotary power shaft, a gate, means mounting the gate on the shaft for linearly moving the gate toward and from the discharge opening in response to rotative movement of the shaft relative to the gate, an abutment on said gate, means on the shaft for engaging the abutment to entrain the gate to angularly swing to an open position, a stop positioned to arrest the closing angular swinging movement of the gate and to permit rotative movement of the shaft relative to the arrested gate in which the means on the shaft is disengaged from the abutment on the gate and the gate is movable linearly toward the opening and a spring helically wound concentrically on the shaft and having radially extending legs at its ends, one of said legs engaging the gate and the other engaging the abutment engaging means on the shaft to yieldably restrain said abutment engaging means and the shaft from movement relative to the gate during the closing swinging movement of the gate until the gate is arrested by the stop, whereupon the shaft overcomes the tension of the spring and moves relative to the arrested gate to move the gate linearly to a closed position.

5. A device as claimed in claim 3, wherein said operating shaft extends transversely through said chute and is enclosed interiorly of the chute by a hollow sleeve radially spaced therefrom, said sleeve having its ends fixed transversely in the opposing walls of the chute with the ends forming bearings for the operating shaft.

6. A device as claimed in claim 5, wherein means is provided for conveying lubrication to the space between the operating shaft and the sleeve.

7. The combination of claim 3, wherein said member has a collar keyed on the shaft and forming a mounting surface for the helically wound spring, the legs of the spring paralleling the member and having their free ends offset.

ROBERT E. HELTZEL.

References Cited in the file of this patent
UNITED STATES PATENTS

| Number | Name | Date |
|--------|------|------|
| 1,359,161 | Gardner | Nov. 16, 1920 |